United States Patent
Bendahan

(10) Patent No.: US 12,442,779 B2
(45) Date of Patent: Oct. 14, 2025

(54) SYSTEMS AND METHODS FOR INSPECTION PORTALS

(71) Applicant: Smiths Detection Inc., Edgewood, MD (US)

(72) Inventor: Joseph Bendahan, San Jose, CA (US)

(73) Assignee: Smiths Detection, Inc., Edgewood, MD (US)

( * ) Notice: Subject to any disclaimer, the term of this patent is extended or adjusted under 35 U.S.C. 154(b) by 305 days.

(21) Appl. No.: 18/004,473

(22) PCT Filed: Jul. 1, 2021

(86) PCT No.: PCT/US2021/040119
§ 371 (c)(1),
(2) Date: Jan. 6, 2023

(87) PCT Pub. No.: WO2022/010738
PCT Pub. Date: Jan. 13, 2022

(65) Prior Publication Data
US 2023/0251209 A1    Aug. 10, 2023

Related U.S. Application Data

(60) Provisional application No. 63/048,317, filed on Jul. 6, 2020.

(51) Int. Cl.
*G01N 23/04* (2018.01)
*G01N 23/083* (2018.01)
(Continued)

(52) U.S. Cl.
CPC .......... *G01N 23/04* (2013.01); *G01N 23/083* (2013.01); *G01N 23/203* (2013.01);
(Continued)

(58) Field of Classification Search
CPC ....... G01N 2223/045; G01N 2223/053; G01N 2223/314; G01N 2223/50;
(Continued)

(56) References Cited

U.S. PATENT DOCUMENTS 6,151,381 A * 11/2000 Grodzins ............... G01V 5/222
378/57
7,400,701 B1   7/2008 Cason
(Continued)

FOREIGN PATENT DOCUMENTS

EP          2049888 B1    5/2014
WO     2020041161 A1    2/2020

OTHER PUBLICATIONS

European Extended Search Report, Application No. 21837806.5, dated Sep. 18, 2024, 15 pps.
(Continued)

*Primary Examiner* — Mark R Gaworecki
(74) *Attorney, Agent, or Firm* — Armstrong Teasdale LLP

(57) ABSTRACT

An inspection portal includes a first x-ray source configured to emit a first beam, a first backscatter detector configured to detect backscatter from the first beam, a second x-ray source configured to emit a second beam, a second backscatter detector configured to detect backscatter from the second beam, and at least one first collimator and at least one second collimator, each oriented to detect backscatter from the associated beam and to block scatter from the other beam. The first and second backscatter detectors are configured to weight signals acquired using each of their detector element based on the first and second beams. The first backscatter detector is configured to use signal processing techniques to mitigate crosstalk due to scatter from the second beam, and (Continued)

the second backscatter detector is configured to use the signal processing techniques to mitigate crosstalk due to scatter from the first beam.

12 Claims, 17 Drawing Sheets

(51) Int. Cl.
*G01N 23/203* (2006.01)
*G01N 33/22* (2006.01)
*G01V 5/222* (2024.01)

(52) U.S. Cl.
CPC ........... *G01N 33/227* (2013.01); *G01V 5/222* (2024.01); *G01N 2223/045* (2013.01); *G01N 2223/053* (2013.01); *G01N 2223/314* (2013.01); *G01N 2223/50* (2013.01); *G01N 2223/643* (2013.01)

(58) Field of Classification Search
CPC ............. G01N 2223/643; G01N 23/04; G01N 23/083; G01N 23/203; G01N 33/227; G01V 5/222
See application file for complete search history.

(56) References Cited

U.S. PATENT DOCUMENTS

| | | |
|---|---|---|
| 9,417,060 B1 | 8/2016 | Schubert |
| 2002/0031202 A1 | 3/2002 | Callerame et al. |
| 2011/0090059 A1 | 4/2011 | Sadr |
| 2016/0003967 A1 | 1/2016 | Chen et al. |
| 2018/0328861 A1 | 11/2018 | Grodzins et al. |
| 2019/0293810 A1 | 9/2019 | Couture et al. |

OTHER PUBLICATIONS

PCT International Search Report and Written Opinion, Application No. PCT/US2021/040119, dated Oct. 20, 2021, 10 pages.

* cited by examiner

180
SYSTEMS AND METHODS FOR INSPECTION PORTALS

CROSS-REFERENCE TO RELATED APPLICATIONS

This application is a national stage application of PCT/US2021/040119, filed on Jul. 1, 2021, which claims priority to U.S. Provisional Patent Application Ser. No. 63/048,317, filed Jul. 6, 2020, entitled "SYSTEMS AND METHODS FOR INSPECTION PORTALS," both of which are incorporated herein by reference in their entirety.

BACKGROUND

The embodiments described herein relate generally to inspection portals, and more particularly, to vehicle inspection portals using x-ray imaging technology.

At least some known inspection systems are capable of inspecting vehicles for explosives, weapons, drugs, and/or other contraband. These systems may be located at, for example, borders, checkpoints, and/or entrances to sensitive facilities. In such systems, x-ray imaging may be used to facilitate the inspection, as x-rays are capable of penetrating vehicles and detecting concealed contraband in a non-intrusive manner.

In at least some known systems, the vehicle to be inspected is stopped, and any occupants of the vehicle leave the vehicle. Subsequently, a gantry including x-ray sources and detectors moves about the stopped vehicle to scan the vehicle. Alternatively, in some known systems, the x-ray sources and detectors are stationary, and the vehicle is translated through the system. Such systems result in low throughput, which is incompatible for heavily trafficked locations.

To obtain higher throughput, in at least some known systems, the vehicle is driven through an inspection portal while the inspection system exposes the vehicle to x-rays at a safe level for occupants within the vehicle. Such systems may use backscatter radiography to image the vehicle (as opposed to transmission radiography). Because backscatter radiography results in lower x-ray penetration of the vehicle, multiple views are generally desirable to improve image quality. However, using multiple views may cause x-ray interference, resulting in poor image quality. Accordingly, there is a need for a vehicle inspection portal with improved image quality and higher throughput.

BRIEF SUMMARY

In one aspect, an inspection portal for imaging an object is provided. The inspection portal includes a first x-ray source configured to emit a first beam towards the object, a first backscatter detector configured to detect backscatter from the first beam, a second x-ray source configured to emit a second beam towards the object, a second backscatter detector configured to detect backscatter from the second beam, and at least one first collimator coupled to the first backscatter detector and at least one second collimator coupled to the second backscatter detector, the at least one first collimator oriented to detect backscatter from the first beam and to block scatter from the second beam, and the at least one second collimator oriented to detect backscatter from the second beam and to block scatter from the first beam.

In another aspect, an inspection portal for imaging an object is provided. The inspection portal includes a first x-ray source configured to emit a first beam towards the object, a first backscatter detector configured to detect backscatter from the first beam, a second x-ray source configured to emit a second beam towards the object, and a second backscatter detector configured to detect backscatter from the second beam, wherein he first backscatter detector is configured to use signal processing techniques to mitigate crosstalk due to scatter from the second beam, and wherein the second backscatter detector is configured to use the signal processing techniques to mitigate crosstalk due to scatter from the first beam.

In another aspect, an inspection portal for imaging an object is provided. The inspection portal includes a single x-ray source configured to emit a beam, wherein the single x-ray source includes an x-ray tube, a collimator defining an aperture configured to generate a transmission beam from a first portion of the beam, a shutter configured to selectively block the aperture defined by the collimator, a transmission detector configured to detect transmission from the transmission beam, a chopper wheel configured to generate a backscatter beam from a second portion of the beam, and a backscatter detector configured to detect backscatter from the backscatter beam, wherein the chopper wheel and the shutter are configured such that the transmission beam and the backscatter beam are not incident on the object simultaneously.

In yet another aspect, an inspection portal for imaging an object is provided. The inspection portal includes a first x-ray source configured to emit a first beam, a collimator defining an aperture configured to generate a transmission beam from the first beam, a transmission detector configured to detect transmission from the transmission beam, a second x-ray source configured to emit a second beam, wherein the first and second x-ray sources include x-ray tubes, a chopper wheel configured to generate a backscatter beam from the second beam, and a backscatter detector configured to detect backscatter from the backscatter beam, wherein the inspection portal is configured such that the transmission beam and the backscatter beam are not incident on the object simultaneously.

In yet another embodiment, an inspection portal for imaging an object is provided. The inspection portal includes a first x-ray source configured to emit a first beam, a collimator defining an aperture configured to generate a transmission beam from the first beam, a transmission detector configured to detect transmission from the transmission beam, a second x-ray source configured to emit a second beam, a chopper wheel configured to generate a backscatter beam from the second beam, a backscatter detector configured to detect backscatter from the backscatter beam, and at least one collimator coupled to the backscatter detector, said at least one collimator positioned and oriented to prevent backscatter from the transmission beam from reaching the backscatter detector.

In yet another aspect, an inspection portal for imaging an object is provided. The inspection portal includes a first x-ray source configured to emit a first beam towards the object, a first backscatter detector configured to detect backscatter from the first beam, a second x-ray source configured to emit a second beam towards the object, a second backscatter detector configured to detect backscatter from the second beam, and at least one first collimator coupled to the first backscatter detector and at least one second collimator coupled to the second backscatter detector, the at least one first collimator oriented to detect backscatter from the first beam and to block scatter from the second beam, and the at least one second collimator oriented to detect backscatter from the second beam and to block scatter from the first beam, wherein the first and second backscatter detectors each include a plurality of detector elements, wherein the first and second backscatter detectors are configured to weight signals acquired using each detector element based on a current position of the first and second beams, wherein the first backscatter detector is configured to use signal processing techniques to mitigate crosstalk due to scatter from the second beam, and wherein the second backscatter detector is configured to use the signal processing techniques to mitigate crosstalk due to scatter from the first beam.

DETAILED DESCRIPTION

The present disclosure is directed to systems and methods for inspection portals for imaging an object. An inspection portal includes a first x-ray source configured to emit a first beam towards the object, a first backscatter detector configured to detect backscatter from the first beam, a second x-ray source configured to emit a second beam towards the object, and a second backscatter detector configured to detect backscatter from the second beam. The system further includes at least one first collimator coupled to the first backscatter detector and at least one second collimator coupled to the second backscatter detector, the at least one first collimator oriented to detect backscatter from the first beam and to block scatter from the second beam, and the at least one second collimator oriented to detect backscatter from the second beam and to block scatter from the first beam. The first and second backscatter detectors each include a plurality of detector elements, wherein the first and second backscatter detectors are configured to weight signals acquired using each detector element based on a current position of the first and second beams. Further the first backscatter detector is configured to use signal processing techniques to mitigate crosstalk due to scatter from the second beam, and the second backscatter detector is configured to use the signal processing techniques to mitigate crosstalk due to scatter from the first beam.

Figure 1:
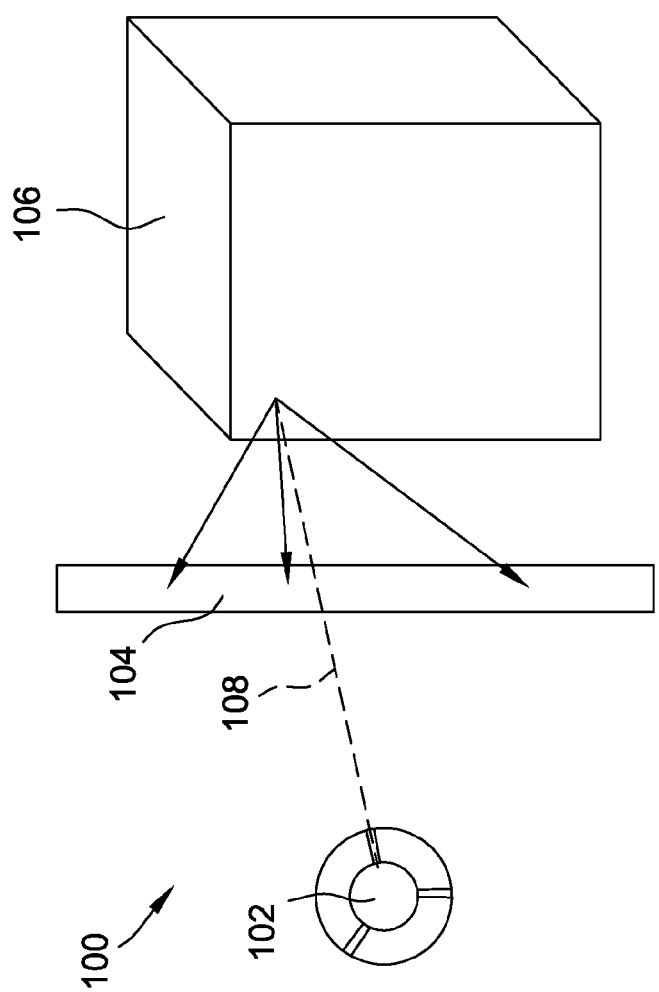
FIG. 1 is a schematic diagram of one example of a known backscatter imaging system.

Many of the embodiments disclosed herein use backscatter radiography to image an object (e.g., a vehicle). FIG. 1 illustrates one example of a known backscatter imaging system 100. Backscatter imaging system 100 includes an x-ray source 102, a backscatter detector 104, and an object 106. In operation, x-ray source 102 emits a pencil beam 108 towards object 106 and scans the pencil beam 108 across object 106.

As shown in FIG. 1, pencil beam 108 interacts with object 106 and is scattered backwards (e.g., back towards x-ray source 102) from object 106. The backscattered beams are detected by backscatter detector 104, and imaging processing techniques are used to produce an image of object 106 from the detected backscattered beams. The resolution of the reconstructed image generally depends on the size of pencil beam 108, a speed of object 106, and a data acquisition rate of backscatter detector 104.

Backscatter imaging system 100 enables scanning and imaging a single side of object 106, with relatively shallow penetration of object 106 by pencil beam 108. Further, backscatter imaging system 100 is capable of producing photo-like images relatively inexpensively, and with relatively low doses of x-ray radiation.

To image all four sides of an object, x-ray sources and corresponding detectors may be positioned on all four sides of the object. However, having x-ray sources and detectors operating on multiple sides simultaneously may result in interference, with an x-ray source on one side interfering with detectors on the other sides. To reduce interference, the x-ray sources and detectors on different sides can be spaced further apart from one another, but this increases the overall footprint of the system, reducing compactness. Another technique for reducing interference involves operating the x-ray sources and detectors on different sides at different times. However, this can result in reduced image quality. The embodiments described herein facilitate improving image quality while maintaining a smaller footprint in backscatter imaging systems.

Figure 2:
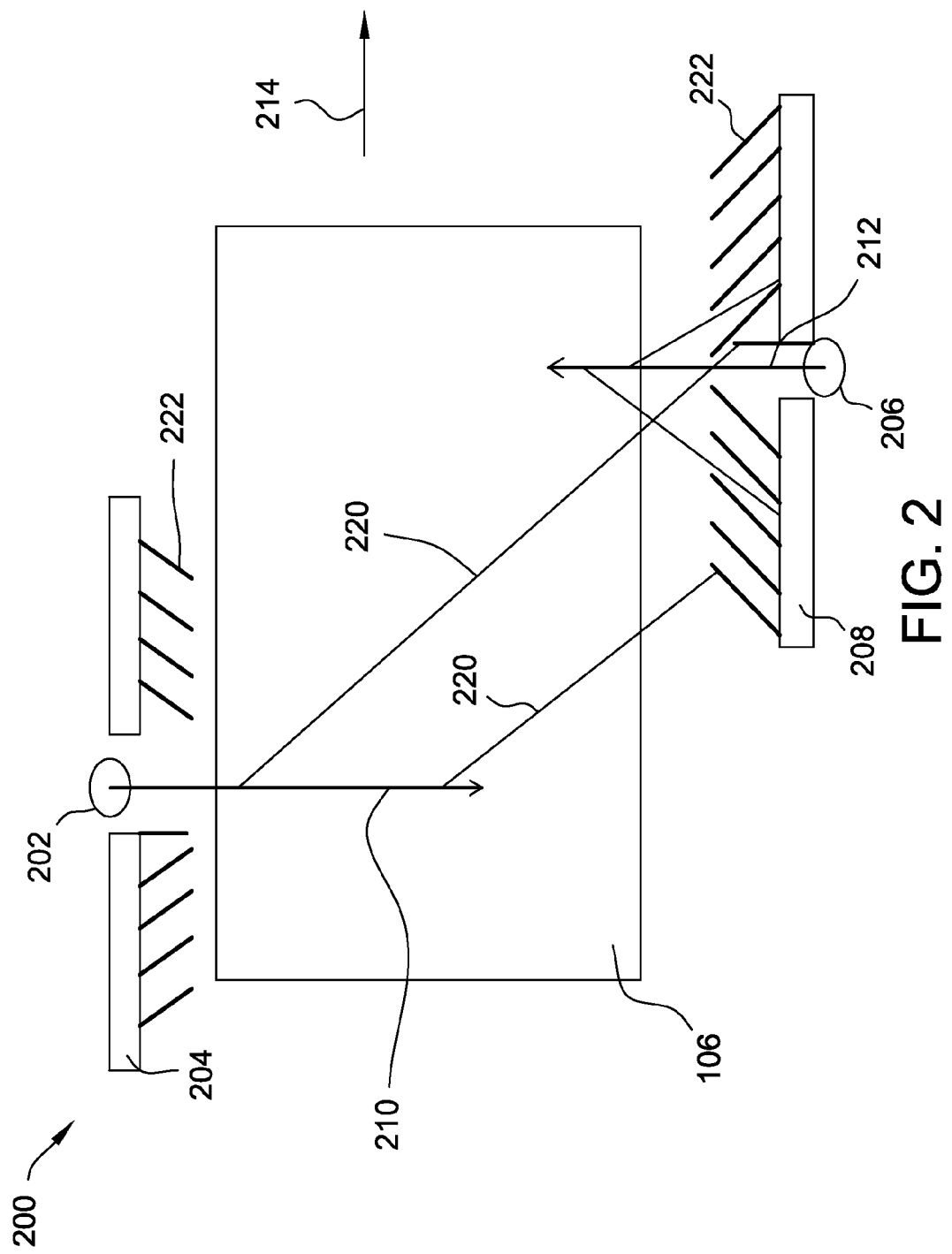
FIG. 2 is a top schematic view of one example embodiment of an imaging system in accordance with the present disclosure.

FIG. 2 is a top schematic view of one example embodiment of an imaging system 200 in accordance with the present disclosure. Imaging system 200 includes a first x-ray source 202, a first backscatter detector 204, a second x-ray source 206, and a second backscatter detector 208. In operation, first backscatter detector 204 detects backscatter from a first beam 210 emitted by first x-ray source 202, and second backscatter detector 208 detects backscatter from a second beam 212 emitted by second x-ray source 206. First x-ray source 202 and second x-ray source 206 are on opposite sides of object 106, and are also offset from one another along a direction of travel 214 of object 106. Object 106 may be translated through imaging system 200 along direction of travel 214. For example, if object 106 is a vehicle, the vehicle may be driven along direction of travel 214 during imaging.

During operation, first beam 210 may result in one or more deflected beams 220 travelling towards second backscatter detector 208 which could interfere with second backscatter detector 208. Accordingly, as shown in FIG. 2, in this embodiment, a plurality of collimators 222 are coupled to first backscatter detector 204 and second backscatter detector 208. Collimators 222 are made of an x-ray blocking material (e.g., tungsten) and are positioned and oriented to prevent deflected x-ray beams from an x-ray source from entering a backscatter detector associated with another x-ray source. Specifically, collimators 222 are oriented obliquely relative to first beam 210 and second beam 212 (and are also oriented obliquely relative to direction of travel 214). In this arrangement, collimators 222 on second backscatter detector 208 prevent deflected beams 220 from first x-ray source 202 from entering second backscatter detector 208, and collimators 222 on first backscatter detector 204 prevent deflected beams from second x-ray source 206 from entering first backscatter detector 204. Using collimators 222, first and second x-ray sources 202 and 206 may operate simultaneously without significantly interfering with one another.

Figure 3A:
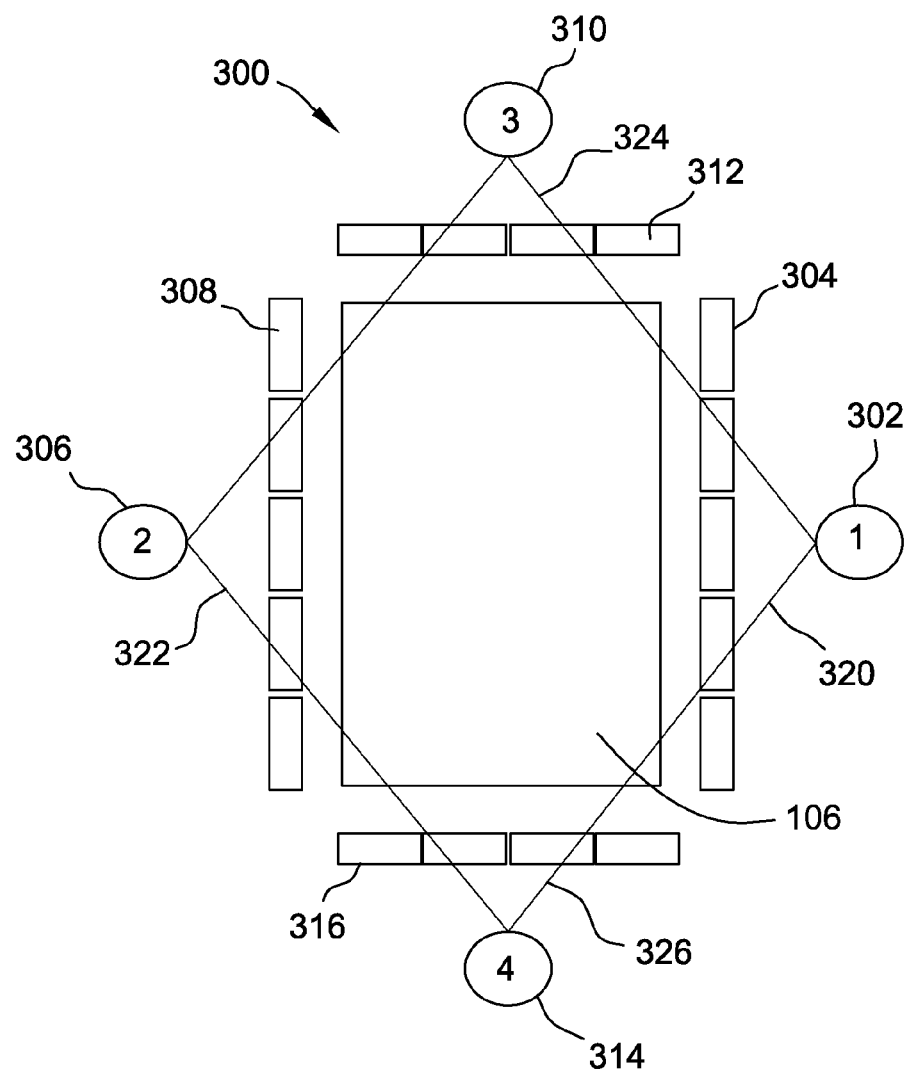
FIG. 3A is an end schematic view of another example embodiment of an imaging system.
Figure 3B:
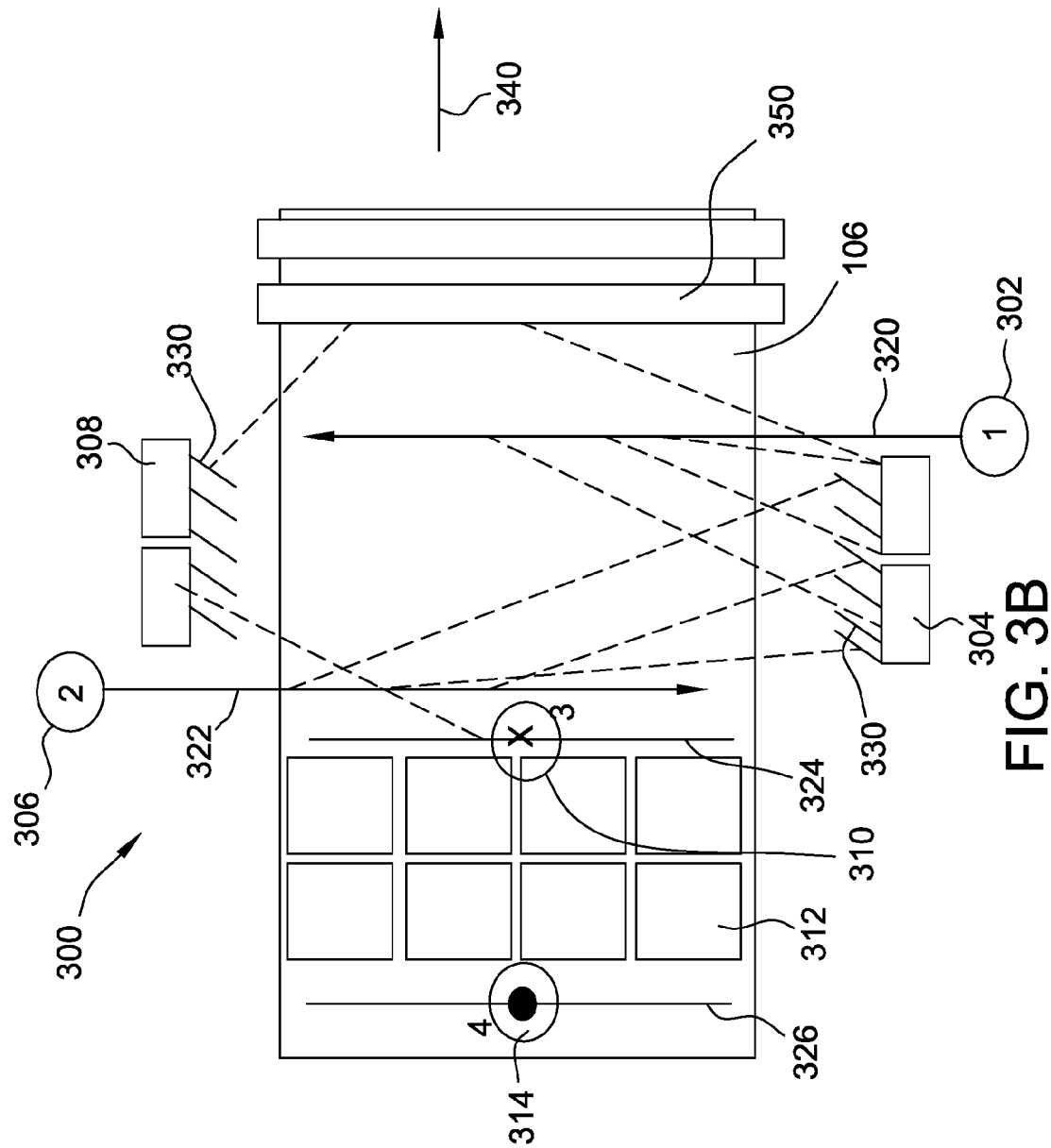
FIG. 3B is a top schematic view of the imaging system shown in FIG. 3A.

FIG. 3A is an end schematic view of another example embodiment of an imaging system 300, and FIG. 3B is a top schematic view of imaging system 300. System 300 includes four x-ray sources and corresponding detectors—a first x-ray source 302, a first backscatter detector 304, a second x-ray source 306, a second backscatter detector 308, a third x-ray source 310, a third backscatter detector 312, a fourth x-ray source 314, and a fourth backscatter detector 316. First x-ray source 302 emits a first beam 320, second x-ray source 306 emits a second beam 322, third x-ray source 310 emits a third beam 324, and fourth x-ray source 314 emits a fourth beam 326.

As shown in FIG. 3B, backscatter detectors 304, 408, 312, and 316 may be coupled to collimators 330 (similar to collimators 222 shown in FIG. 2) positioned and oriented to prevent deflected beams from an x-ray source from entering detectors associated with other x-ray sources. X-ray sources 302, 306, 310, and 314 are offset from one another along a direction of travel 340 of object 106. Object 106 may be translated through imaging system 300 along direction of travel 340. For example, if object 106 is a vehicle, the vehicle may be driven along direction of travel 340 during imaging. Further, the backscatter detectors are located on only one side of the associated x-ray beam to reduce interference, as the scattered radiation from other sources can be blocked by the associated collimators.

In this embodiment, two x-ray sources and associated detectors are active simultaneously, while the other two x-ray sources and associated detectors and sources are inactive. For example, first and second x-ray sources 302 and 306 are active while third and fourth x-ray sources 310 and 314 are inactive, and vice versa.

As shown in FIG. 3B, system 300 also includes at least one transmission system 350 (i.e., for transmission radiography) including a transmission x-ray source and a transmission detector. In general, if the transmission x-ray source is far enough away from backscatter detectors 304, 308, 312, and 316, the systems can operate simultaneously. Further, backscatter sources (e.g., first, second, third, and fourth x-ray sources 302, 306, 310, and 314) generally produce little background in transmission detectors. Accordingly, transmission detectors can generally collect data while backscatter systems operate.

However, if the transmission x-ray source is close enough, x-rays from transmission system 350 may interfere with at least some of backscatter detectors 304, 308, 312, and 316. Accordingly, in one example, first and second backscatter detectors 304 and 308 are inactive while transmission system 350 is active (because first and second backscatter detectors 304 and 308 may be relatively close to transmission system 350). Because of the orientation of collimators 330, in some situations, second backscatter detector 308 may be able to block at least some x-ray beams from transmission system 350 (and accordingly may remain active while transmission system 350 is active in certain situations). Further, third and fourth backscatter detectors 312 and 316 may be far enough away from transmission system 350 such that third and fourth backscatter detectors 312 and 316 are active while transmission system 350 is active in some embodiments. Additional embodiments of combined systems including backscatter systems and transmission systems are described below.

Figure 4A:
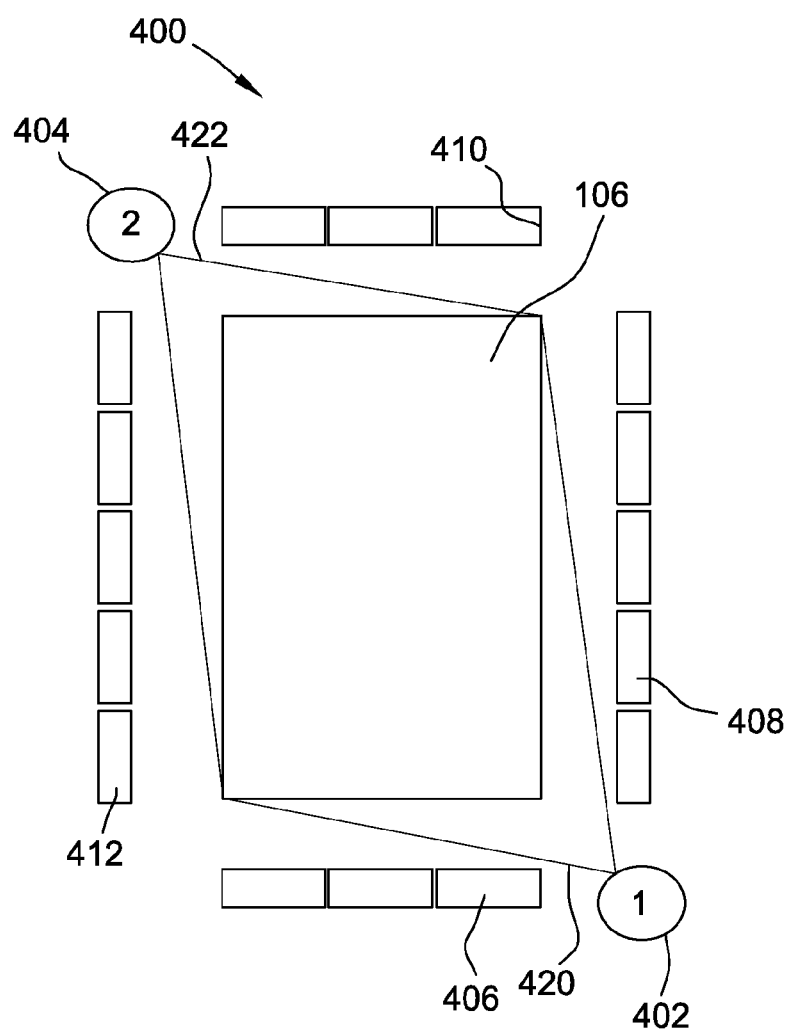
FIG. 4A is an end schematic view of another example embodiment of an imaging system.
Figure 4B:
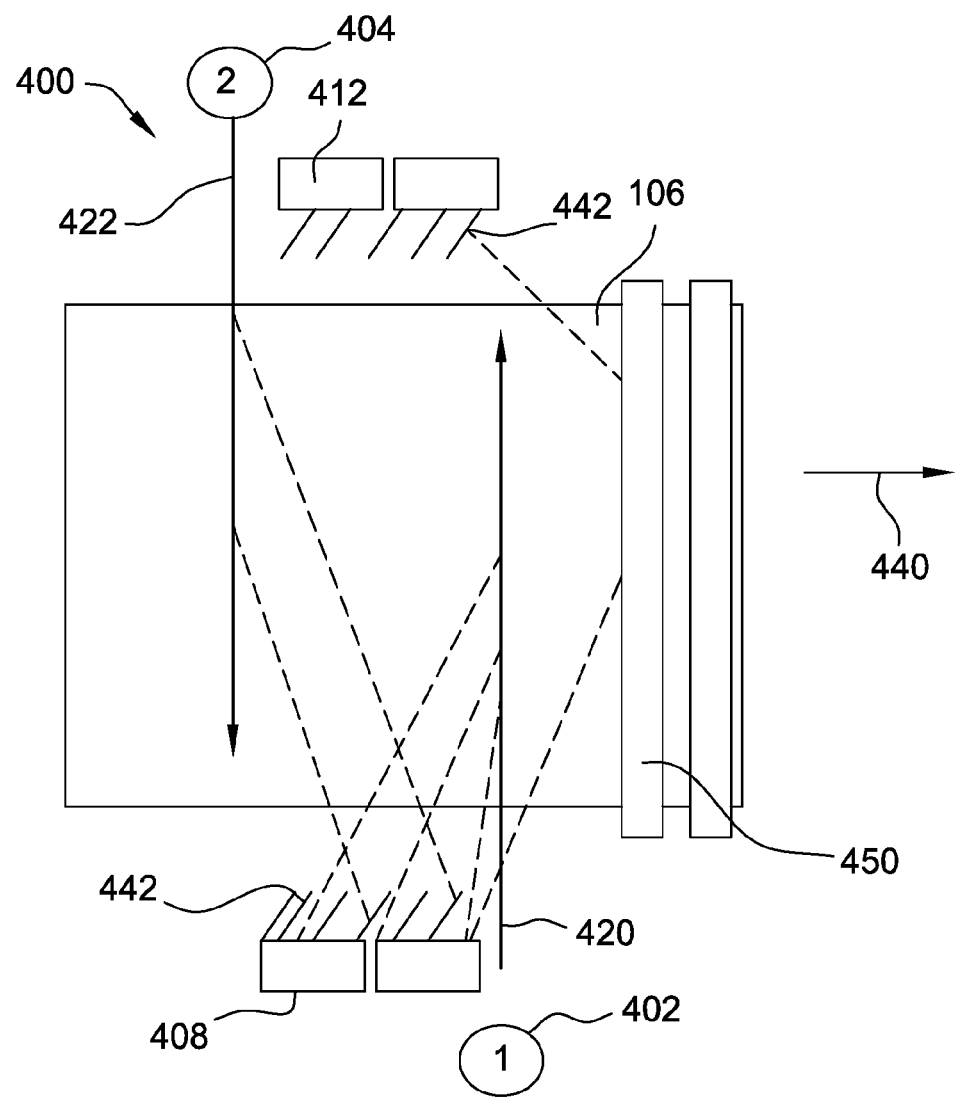
FIG. 4B is a top schematic view of the imaging system shown in FIG. 4A.

FIG. 4A is an end schematic view of another example embodiment of an imaging system 400, and FIG. 4B is a top schematic view of imaging system 400. System 400 includes two x-ray sources and four sets of detectors—a first x-ray source 402, a second x-ray source 404, a first backscatter detector 406, a second backscatter detector 408, a third backscatter detector 410, and a fourth backscatter detector 412. First x-ray source 402 emits a first beam 420, and second x-ray source 404 emits a second beam 422. In this embodiment, x-ray sources 402 and 404 are oriented obliquely with respect to backscatter detectors 406, 408, 410, and 412. Further, in this embodiment all x-ray sources 402 and 404 and backscatter detectors 406, 408, 410, and 412 are active simultaneously.

Specifically, first x-ray source 402 is positioned between first and second backscatter detectors 406 and 408, and deflected beams generated by first beam 420 are detected by first and second backscatter detectors 406 and 408. Similarly, second x-ray source 404 is positioned between third and fourth backscatter detectors 410 and 412, and deflected beams generated by second beam 422 are detected by third and fourth backscatter detectors 410 and 412. Further, as shown in FIG. 4B, first and second x-ray sources 402 and 404 are offset along a direction of travel 440 of object 106, and collimators 442 (similar to the collimators discussed in the above embodiments) may be coupled to backscatter detectors 406, 408, 410, and 412 to block deflected radiation generated by non-associated x-ray sources. In some embodiments, individual detector elements in third and fourth backscatter detectors 410 and 412 may be weighted based on a position of the associated scanning beam.

In this embodiment, imaging system 400 may include at least one transmission system 450 (i.e., for transmission radiography) including a transmission x-ray source and a transmission detector. X-rays from transmission system 450 may interfere with at least some of backscatter detectors 406, 408, 410, and 412. Accordingly, in one example, backscatter detectors 406, 408, 410, and 412 are inactive while transmission system 450 is active. Because of the orientation of collimators 442, in some situations, fourth backscatter detector 412 may be able to block at least some x-ray beams from transmission system 450 (and accordingly may remain active while transmission system 450 is active in certain situations).

Figure 5:
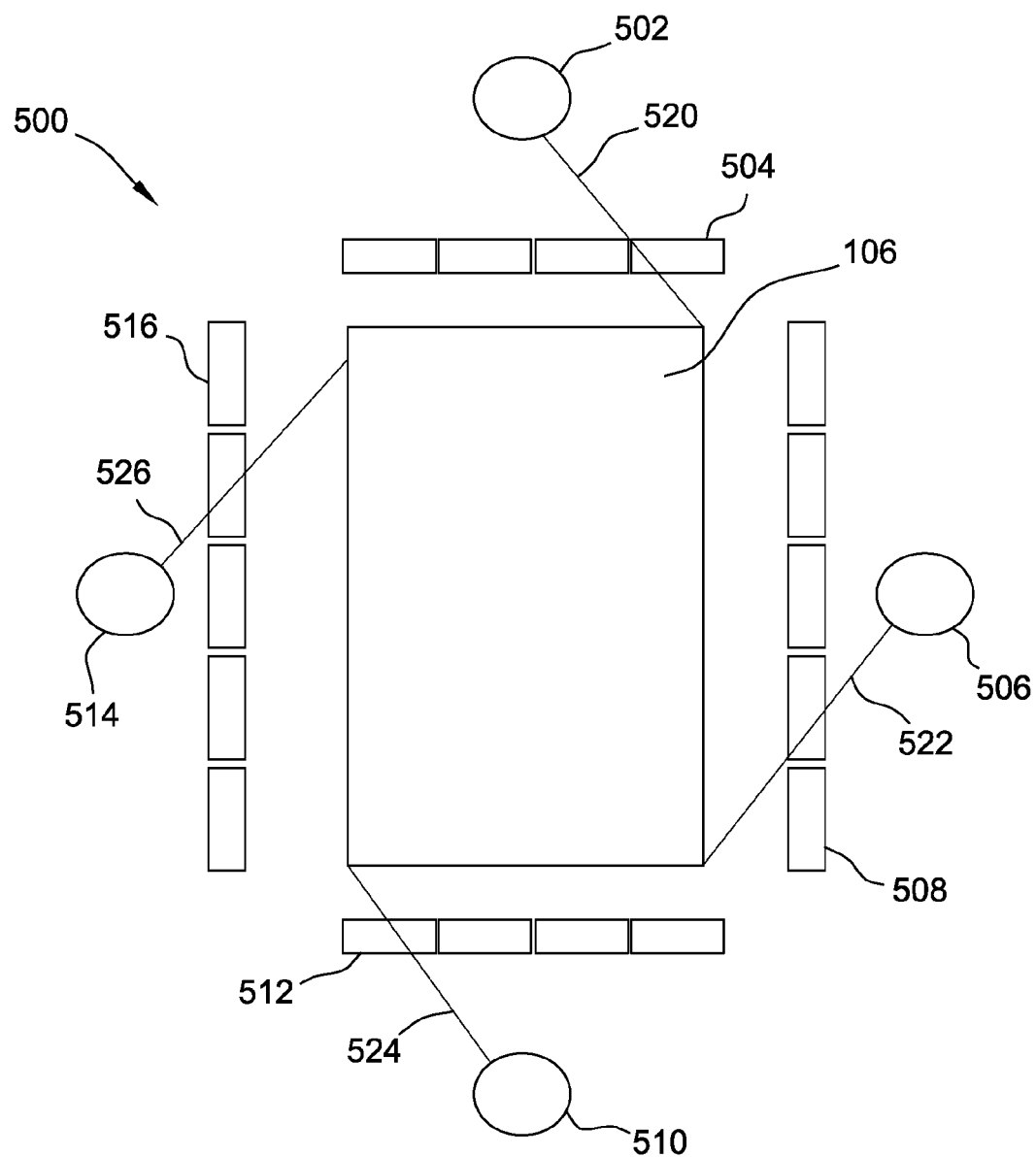
FIG. 5 is an end schematic view of another example embodiment of an imaging system.

FIG. 5 is an end schematic view of another example embodiment of an imaging system 500. System 500 includes four x-ray sources and four detectors—a first x-ray source 502, a first backscatter detector 504, a second x-ray source 506, a second backscatter detector 508, a third x-ray source 510, a third backscatter detector 512, a fourth x-ray source, 514, and a fourth backscatter detector 516. First x-ray source 502 emits a first beam 520, second x-ray source 506 emits a second beam 522, third x-ray source 510 emits a third beam 524, and fourth x-ray source 514 emits a fourth beam 526.

Figure 6:
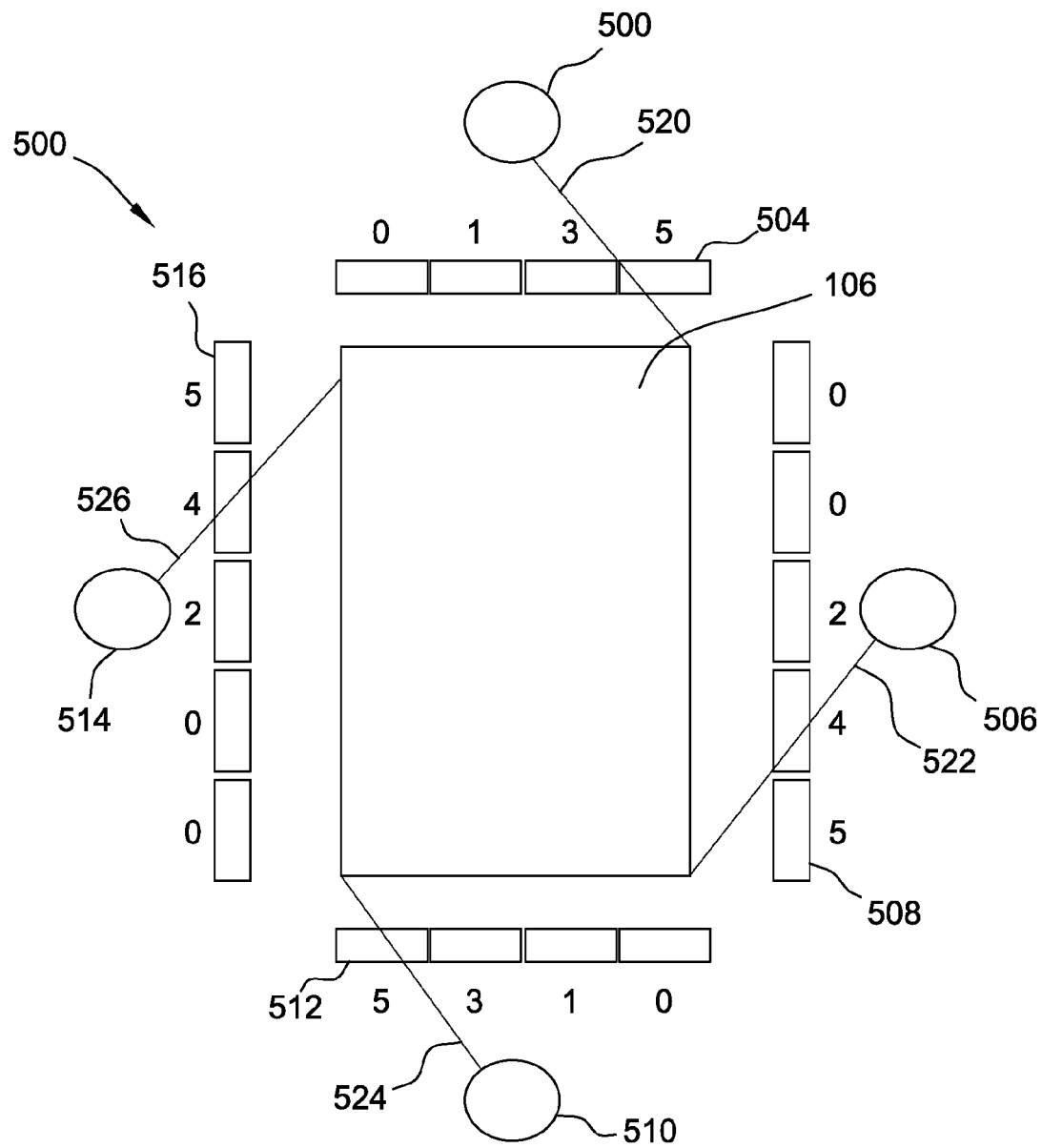
FIG. 6 is an end schematic view of the imaging system shown in FIG. 5.
Figure 7:
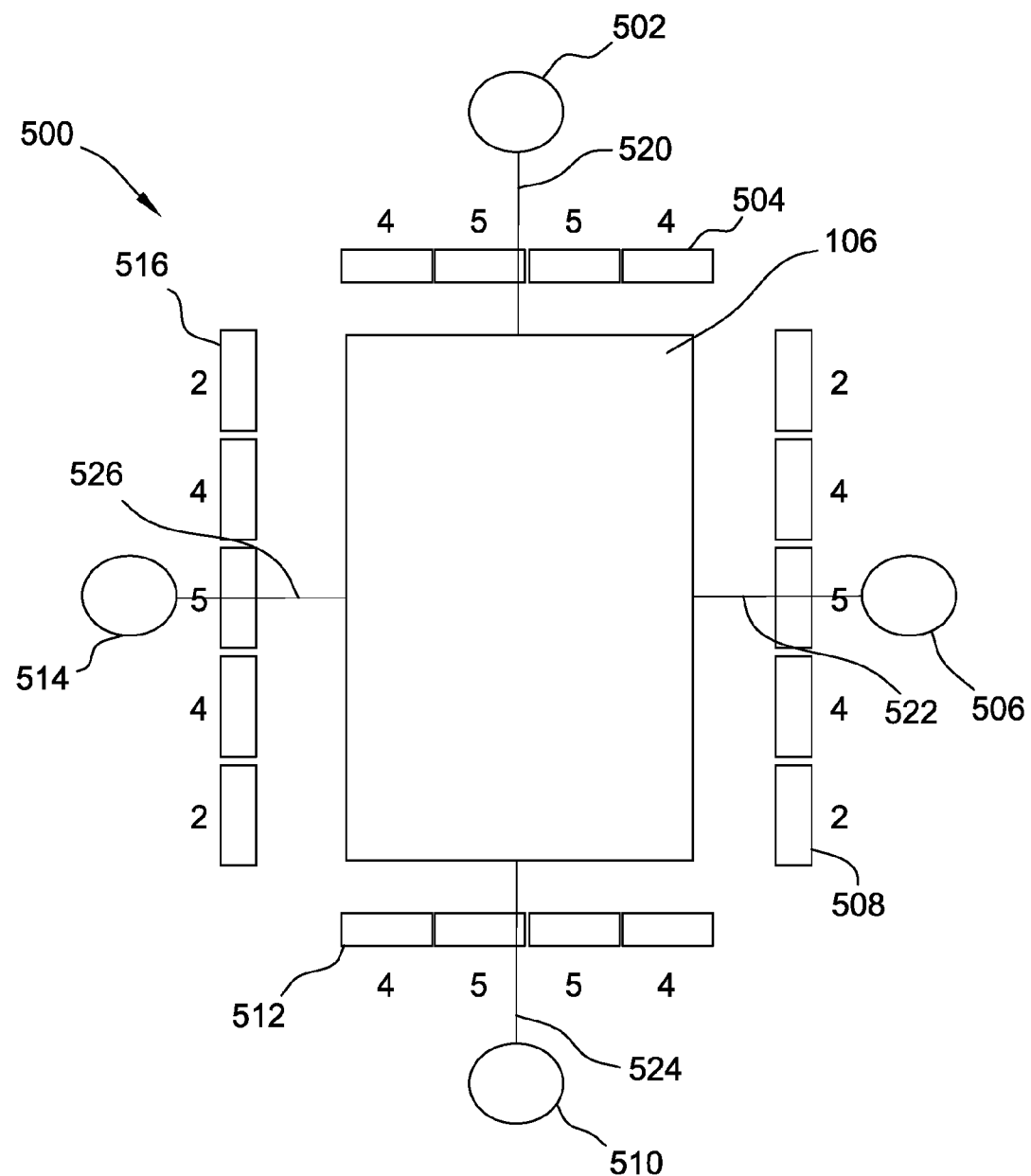
FIG. 7 is an end schematic view of the imaging system shown in FIG. 5.

In this embodiment, x-ray sources 502, 506, 510, and 514 operate simultaneously. However, to reduce interference, beams 520, 522, 524, and 526 each start at one end of object 106 (relative to the particular x-ray source 502, 506, and 510, and 514) and sweep across object 106 at the same rate as each other beam 520, 522, 524, and 526. This ensures that beams 520, 522, 524, and 526 are relatively remote from one another, except when beams 520, 522, 524, and 526 reach a midpoint of their sweep (shown in FIG. 7). In this embodiment, backscatter detectors 504, 508, 512, and 516 are implemented using relatively small detector elements with signals that are weighted based on the current beam positions to provide a high signal with low interference. This is shown in FIGS. 6 and 7, with the weightings indicated by the numerical value proximate the detector element. As shown in FIGS. 6 and 7, detector elements proximate a current beam position are weighted more heavily than detector elements remote from the current beam position. The actual weights used may be determined empirically to optimize image quality.

Signal processing techniques may also be used to improve imaging quality and reduce crosstalk from other sources. Specifically, in the embodiments described herein, the backscatter detectors are coupled to energy-sensitive electronics that measure the energy of detected backscatter radiation. Notably, according to the Compton formula, backscatter radiation generally has a lower energy than forward scattered radiation for an x-ray beam of a given energy. Accordingly, configuring backscatter detectors and the associated electronics to record energy measurements in one range (i.e., a backscatter energy range) while mitigating energy measurements in another range (i.e., a transmission energy range) can reduce noise and improve imaging quality.

Figure 8:
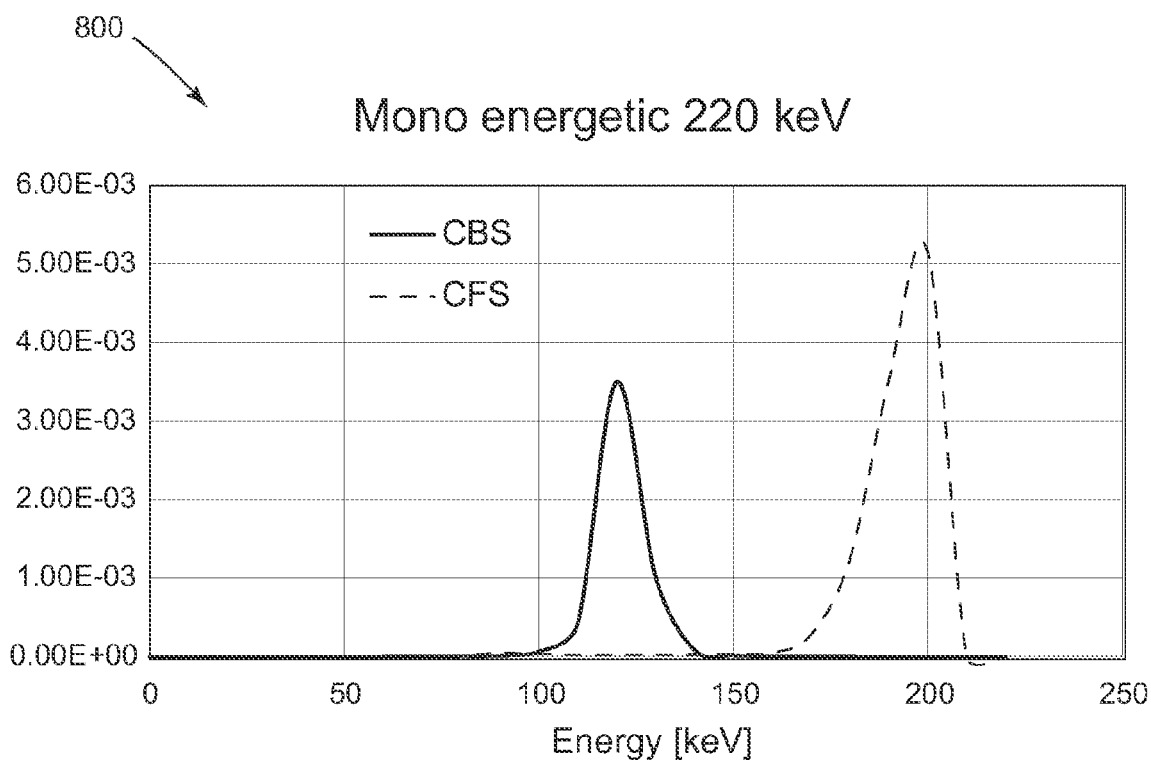
FIG. 8 is a graph showing energy spectra for backscatter radiation and transmission radiation for a quasi-mono-energetic source.
Figure 9:
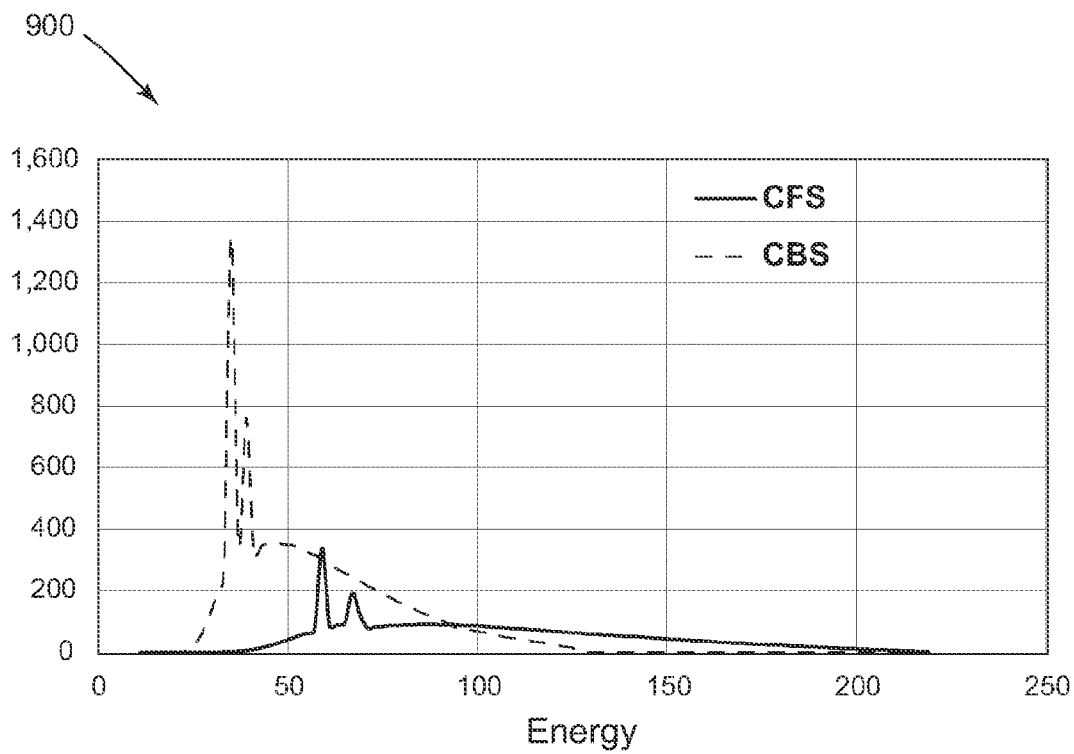
FIG. 9 is a graph showing the energy spectra for backscatter radiation and transmission radiation for Bremsstrahlung sources.

The x-ray sources in the embodiments described herein may be, for example, mono-energetic sources or Bremsstrahlung sources. For quasi-mono-energetic sources, the energy separation between Compton backscatter radiation ("CBS") and Compton forward scatter radiation ("CFS") is generally quite good. For example, FIG. 8 is a graph 800 showing energy spectra for backscatter radiation and transmission radiation for a quasi-mono-energetic source. For Bremsstrahlung sources, however, the energy spectra for backscatter radiation and transmission radiation are relatively broad, and overlap with one another. However, there is still some separation. For example, FIG. 9 is a graph 900 showing the energy spectra for backscatter radiation and transmission radiation for Bremsstrahlung sources. In some embodiments, filters (e.g., a copper filter) may be used with Bremsstrahlung sources to improve the energy separation by reducing low-energy portions of the spectrum.

Figure 10A:
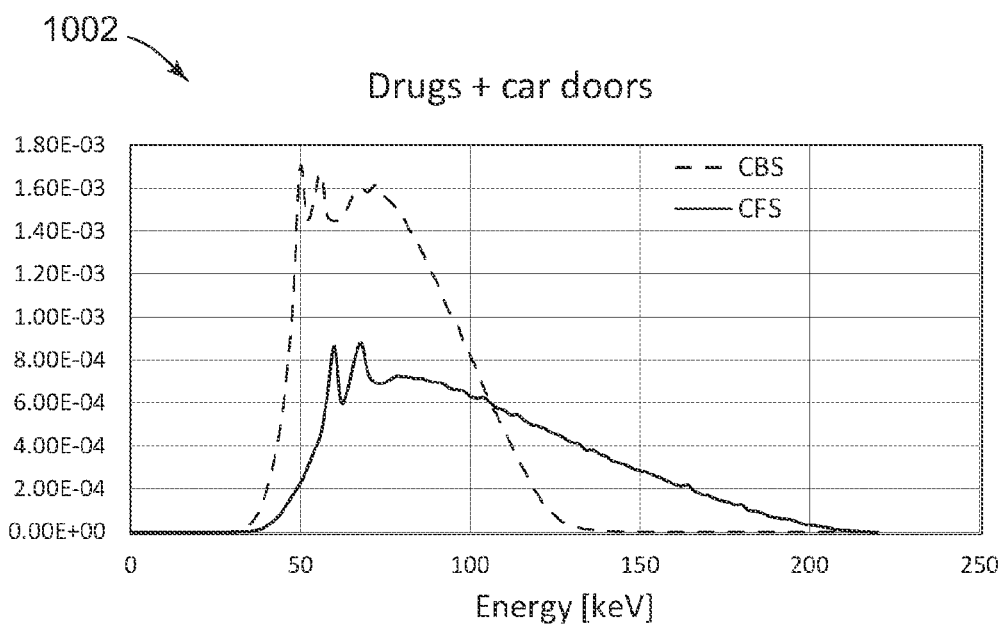
FIGS. 10A and 10B are graphs showing energy spectra for backscatter radiation and transmission radiation for an object containing drugs and car doors, a steel object, and an organic object, respectively.
Figure 10B:
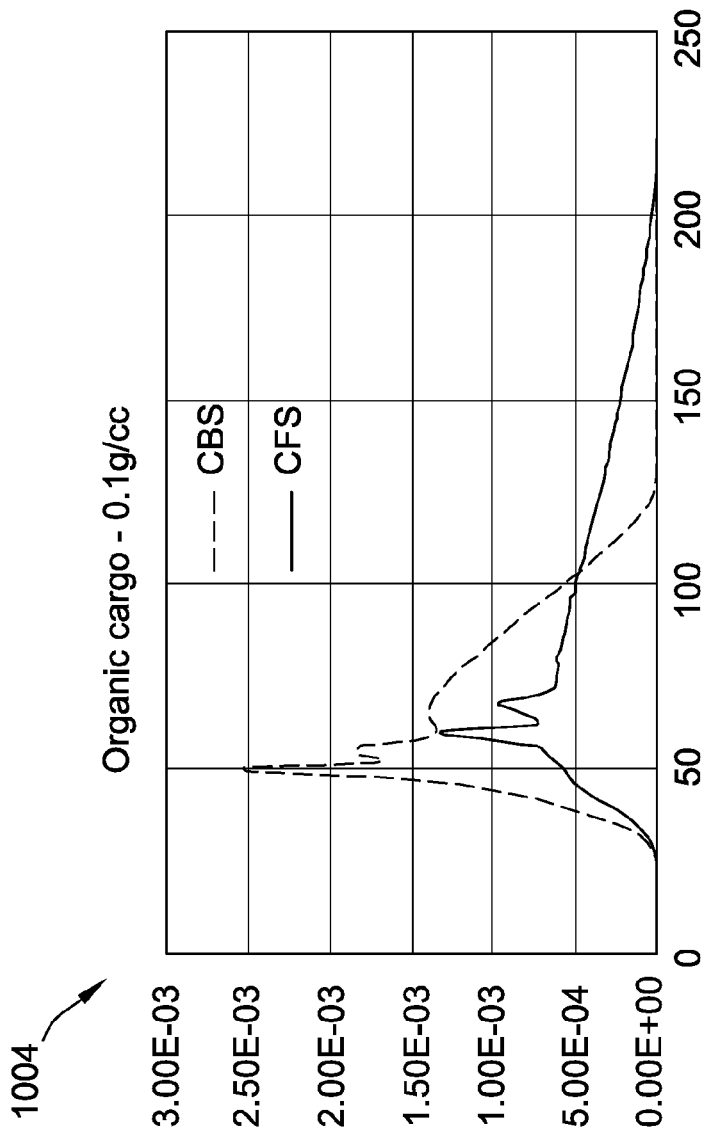

Further, different objects 106 result in different energy spectra. For example, FIGS. 10A and 10B are graphs 1002 and 1004 showing energy spectra for backscatter radiation and forward scatter radiation for an object containing different materials.

Detectors used in typical backscatter applications result in spread of the energy spectrum, which reduces the CBS and CFS spectra. In addition, to increase detection capabilities, the detectors described herein may be implemented using a plastic scintillator loaded with materials having a high atomic number (e.g., bismuth or tin). This enables higher efficiency and improves the energy separation. Silicon photomultipliers may also be used for compactness and higher light collection efficiency to improve the energy resolution.

Accordingly, in imaging system 500, a high-energy threshold (or other signal processing technique) may be used by each backscatter detector to reduce forward scatter from the three non-corresponding beams. This high-energy threshold (or other signal processing technique) may be used in addition to, or as an alternative to, the weighting discussed above. Due to the difference in scattering angles, the energy spectra observed in each backscatter detector 504, 508, 512, and 516 would be different. Accordingly, the high-energy thresholds, similar to the weights, may be determined empirically.

Further, in imaging system 500, the distance between the source and the corresponding backscatter detector is shorter than the distance between the other sources and that backscatter detector. Accordingly, the transmitted radiation on that backscatter detector will be attenuated in most cases. Accordingly, implementing high-energy thresholding, detector weighting, and collimators as described herein may result in relatively little interference, and any remaining interference may simply result as reduced contrast in the images.

In some embodiments, the collimators described herein are dynamically adjustable during operation of the system. That is, instead of being static, the collimators may translate and/or pivot relative to the associated backscatter detector to reduce crosstalk and improve image quality. Further, in some embodiments, the backscatter detectors described herein may be implemented using high-energy resolution detectors, instead of low-energy resolution PVT detectors. This may facilitate improving the ability of system to discriminate between backscatter radiation and forward scattered radiation.

The backscatter systems described herein may also be used in combination with transmission systems. For example, transmission systems have higher penetration, and have much greater scatter due the larger number of x-rays emitted in a fan beam (as opposed to the pencil beam of backscatter systems). Including a transmission system increases the possibility of interference. To reduce interference, the transmission system may be positioned remotely from any backscatter systems—however, this will increase the size of the overall system. Accordingly, the systems and methods described herein include techniques for operating backscatter and transmissions systems to reduce interference.

For a pulsed x-ray source (e.g., a LINAC), the pulse width is a few microseconds, and the effect can be easily removed from a backscatter image. However, x-ray tubes are less expensive and more suitable when high penetration is not required. X-ray tubes produce radiation continuously which may interfere with backscatter signals. Accordingly, there is a need for a combined imaging system that implements both backscatter and transmission inspection in a compact form factor, for example, when using x-ray tubes.

The combined imaging systems described herein may include one or more x-ray tubes. Gridded x-ray tubes, shutters, fan beam collimators, and/or chopper wheels may be used to control the x-ray beams, as described herein. The combined imaging systems include both transmission and backscatter elements, and also include electronics to synchronize and collect data, as well as computing devices to calibrate and display images. Objects (e.g., vehicles) may be self-driven through the system or may be conveyed through the system via other techniques. Further, in some embodiment the elements of the system are mounted on a gantry that is rotated and/or translated relative to the object to be imaged.

Figure 11:
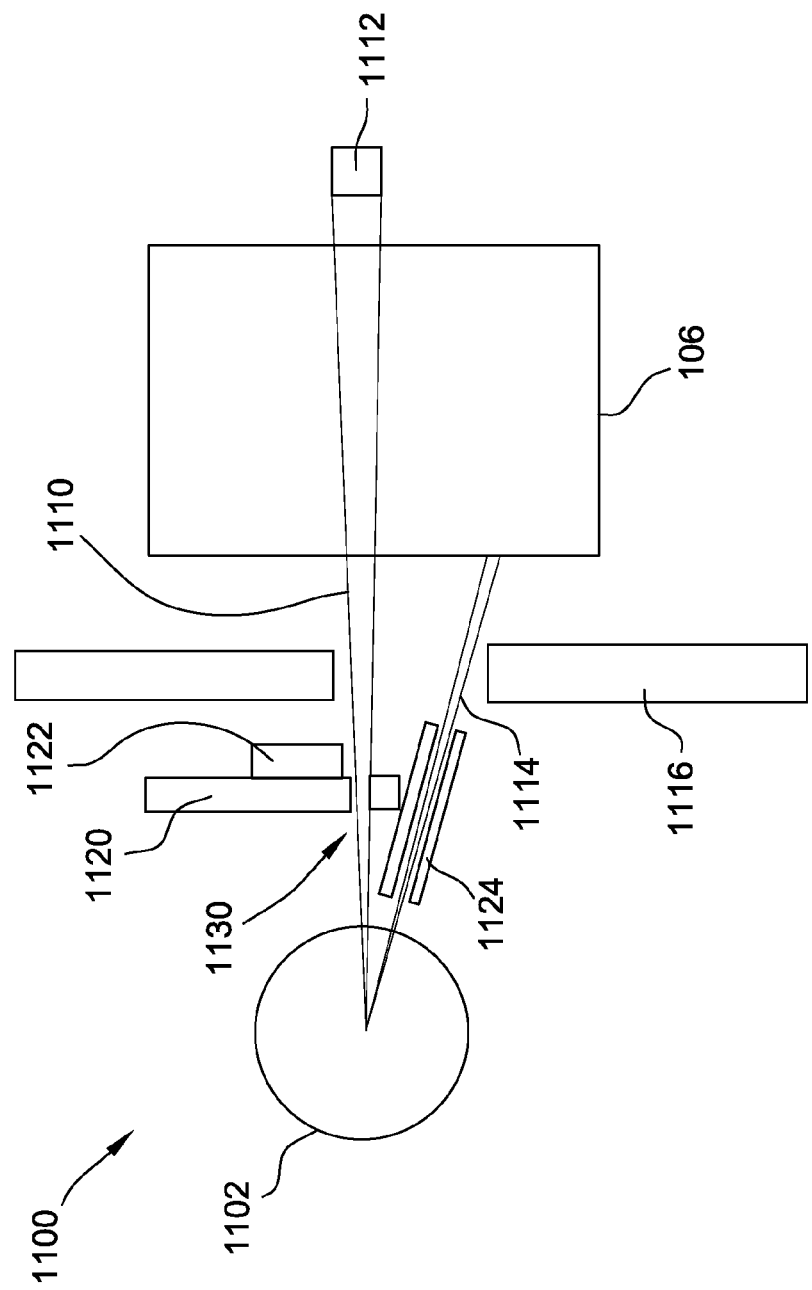
FIG. 11 is a top schematic view of an example embodiment of a combined imaging system.

FIG. 11 is a top schematic view of an example embodiment of a combined imaging system 1100. Combined imaging system 1100 includes a single x-ray source 1102 that is used for both backscatter and transmission radiography, as described herein. X-ray source 1102 emits a wide beam that forms a transmission beam 1110 that is detected using a transmission detector 1112, as well as a backscatter beam 1114 that deflects off of object 106 for detection by a backscatter detector 1116. As shown in FIG. 11, a fan beam collimator 1120 and shutter 1122 control transmission of transmission beam 1110 towards object 106, and a chopper wheel 1124 controls transmission of backscatter beam 1114 towards object 106.

Specifically, shutter 1122 moves to selectively cover and uncover an aperture 1130 defined in fan beam collimator 1120, selectively blocking and unblocking transmission beam 1110. Further, chopper wheel 1124 rotates to selectively block and unblock backscatter beam 1114. In some embodiments, an additional shutter and aperture may be used to generate an additional transmission beam from x-ray source 1102, the additional transmission beam detectable by an additional transmission detector.

Figure 12B:
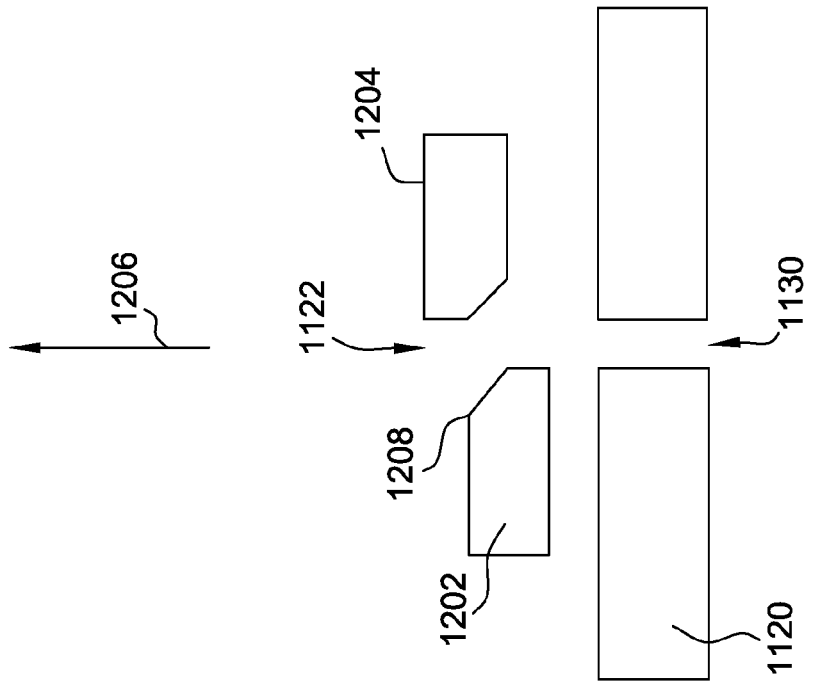
FIGS. 12A and 12B are schematic diagrams of one embodiment of a shutter and a fan beam collimator that may be used with the combined imaging system shown in FIG. 11.
Figure 12A:
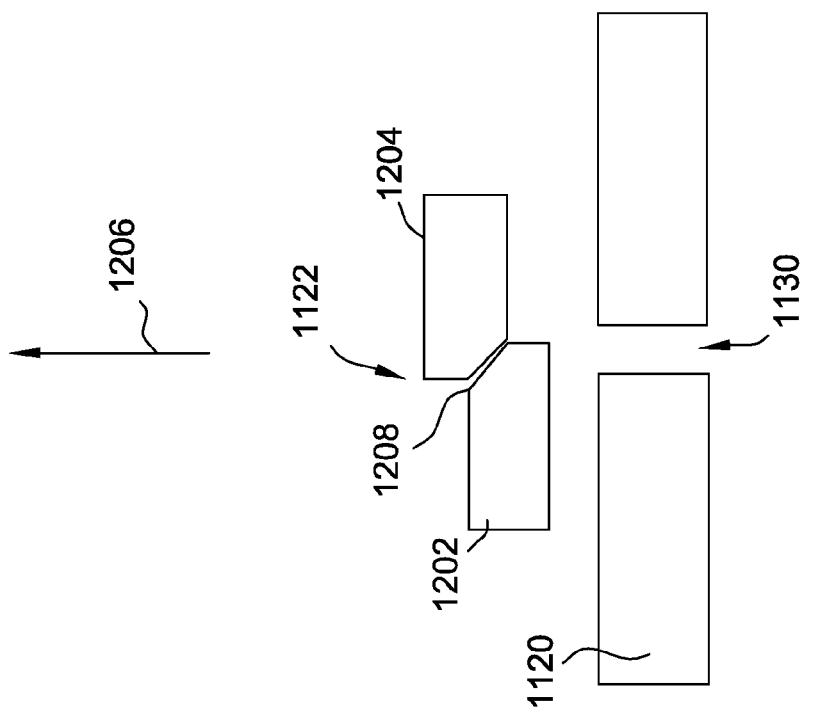

FIGS. 12A and 12B are schematic diagrams of one embodiment of shutter 1122 and fan beam collimator 1120. To reduce an amount of time that transmission beam 1110 is partially blocked, it is desirable that shutter 1122 can quickly transition between a closed position in which aperture 1130 is blocked (shown in FIG. 12A) and an open position in which aperture 1130 is unblocked (shown in FIG. 12B).

In this embodiment, shutter 1122 includes a first section 1202 and a second section 1204 that move apart from each other to switch the shutter 1122 from the closed position to the open position. The first and second sections 1202 and 1204 are offset from one another along a beam travel direction 1206. To ensure transmission beam 1110 is blocked in the closed position, first and second sections 1202 and 1204 overlap in the closed position at a chamfered interface 1208. The first and second sections 1202 and 1204 may be moved using any suitable actuation device. By using two different sections 1202 1204, the amount of time it takes to transition between the open and closed positions is reduced.

Figure 13A:
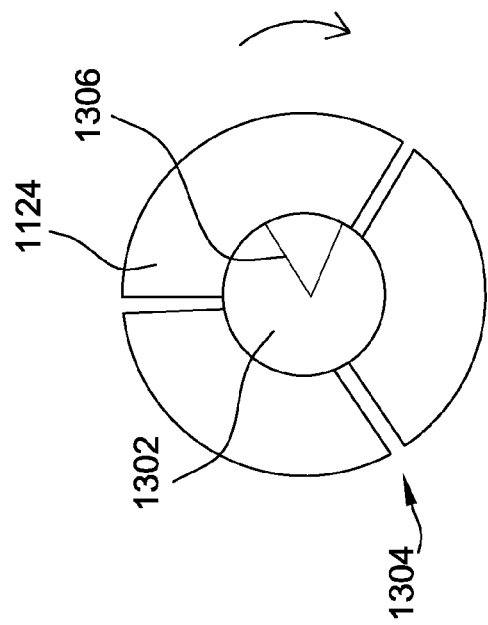
FIGS. 13A and 13B are schematic diagrams of one embodiment of a chopper wheel 1124 may be used with the combined imaging system shown in FIG. 11.
Figure 13B:
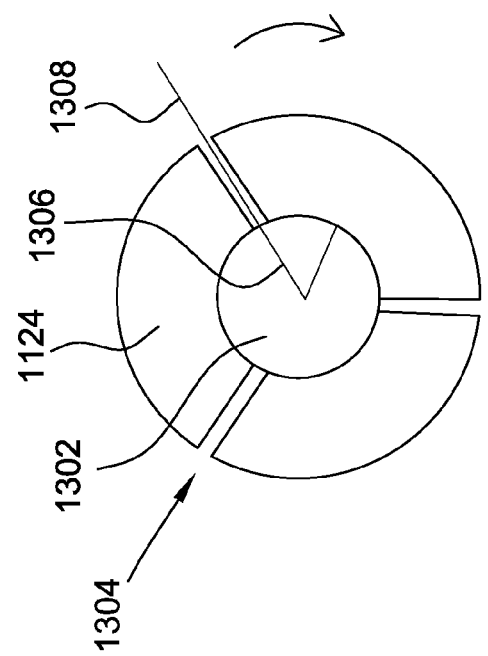

FIGS. 13A and 13B are schematic diagrams of one embodiment of chopper wheel 1124. In this embodiment, chopper wheel 1124 rotates about an x-ray source 1302 (e.g., x-ray source 1102). Further, chopper wheel 1124 includes a plurality of apertures 1304 (e.g., three apertures 1304 in the embodiment shown). Accordingly, as chopper wheel 1124 rotates, an x-ray fan beam 1306 is blocked and partially unblocked repeatedly (i.e., at a frequency that depends on the rotational speed of chopper wheel 1124 and the number of apertures 1304). For example, in FIG. 13A, only a portion of fan beam 1306 is blocked (generating a pencil beam 1308), whereas in FIG. 3B, the entire beam 1306 is blocked.

Referring back to FIG. 11, in this embodiment, shutter 1122 and chopper wheel 1124 are controlled such that transmission beam 1110 and backscatter beam 1114 are incident upon object 106 at different times. That is, when transmission beam 1110 is incident upon object 106, backscatter beam 1114 is blocked by chopper wheel 1124. Similarly, when backscatter beam 1114 is incident upon object 106, shutter 1122 blocks transmission beam 1110. Further, backscatter detector 1116 collects data while backscatter beam 1114 is incident upon object 106, and transmission detector 1112 collects data while transmission beam 1110 is incident upon object 106. In an alternative embodiment, because backscatter beam 1114 produces little background in the transmission detection, backscatter beam 1114 is on all the time.

In general, in system 1100, transmission beam 1110 should not be active while backscatter detector 1116 is active, due to the high crosstalk. However, transmission detector 1112 may remain active when backscatter beam 1114 is on because backscatter beam 1114 typically produces low crosstalk. Accordingly, in one embodiment, i) transmission beam 1110 and transmission detector 1112 are active while backscatter beam 1114 and backscatter detector 1116 are inactive, ii) transmission beam 1110, backscatter beam 1114, and transmission detector 1112 are active while backscatter detector 1116 is inactive, and iii) transmission beam 1110 and transmission detector 1112 are inactive while backscatter beam 1114 and backscatter detector 1116 are active.

Those of skill in the art will appreciate that in some embodiments (e.g., embodiments including multiple x-ray sources), mechanisms other than a shutter may be used to control exposure of object 106 to transmission beam 1110. For example, instead of using a shutter, the x-ray source may be a grid controlled x-ray tube that is selectively activated by controlling a grid voltage. As another example, the x-ray source may be implemented using field emission, which also enables selectively activating the x-ray source.

Figure 14:
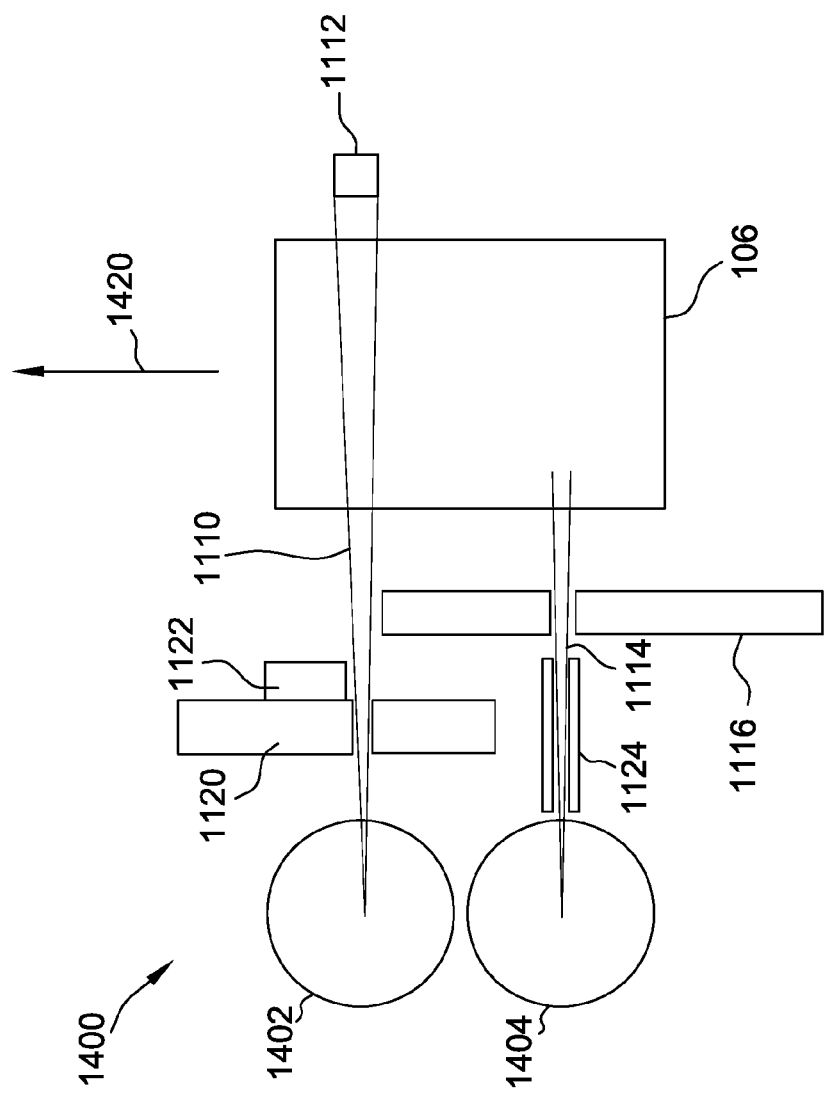
FIG. 14 is a top schematic view of an example embodiment of another combined imaging system.

FIG. 14 is a top schematic view of an example embodiment of another combined imaging system 1400. Unlike combined imaging system 1100 (shown in FIG. 11), combined imaging system 1400 includes a first x-ray source 1402 and a second x-ray source 1404. First x-ray source 1402 generates transmission beam 1110, and second x-ray source 1404 generates backscatter beam 1114. Otherwise, combined imaging system 1400 operates generally similar to combined imaging system 1100. In combined imaging system 1400, first and second x-ray sources 1402 and 1404 may have different x-ray energies and/or intensities. Further, at least one of first and second x-ray sources 1402 and 1404 may be implemented using a gated x-ray tube (implemented, for example, using a grid or field emission source). In such circumstances, shutter 1122 and/or chopper wheel 1124 are not required). In addition, in combined imaging system 1400 the angles of transmission beam 1110 and backscatter beam 1114 may both be perpendicular relative to a direction of travel 1420 of object 106, or at least one of the angles may be oblique relative to direction of travel 1420 of object 106.

Figure 15:
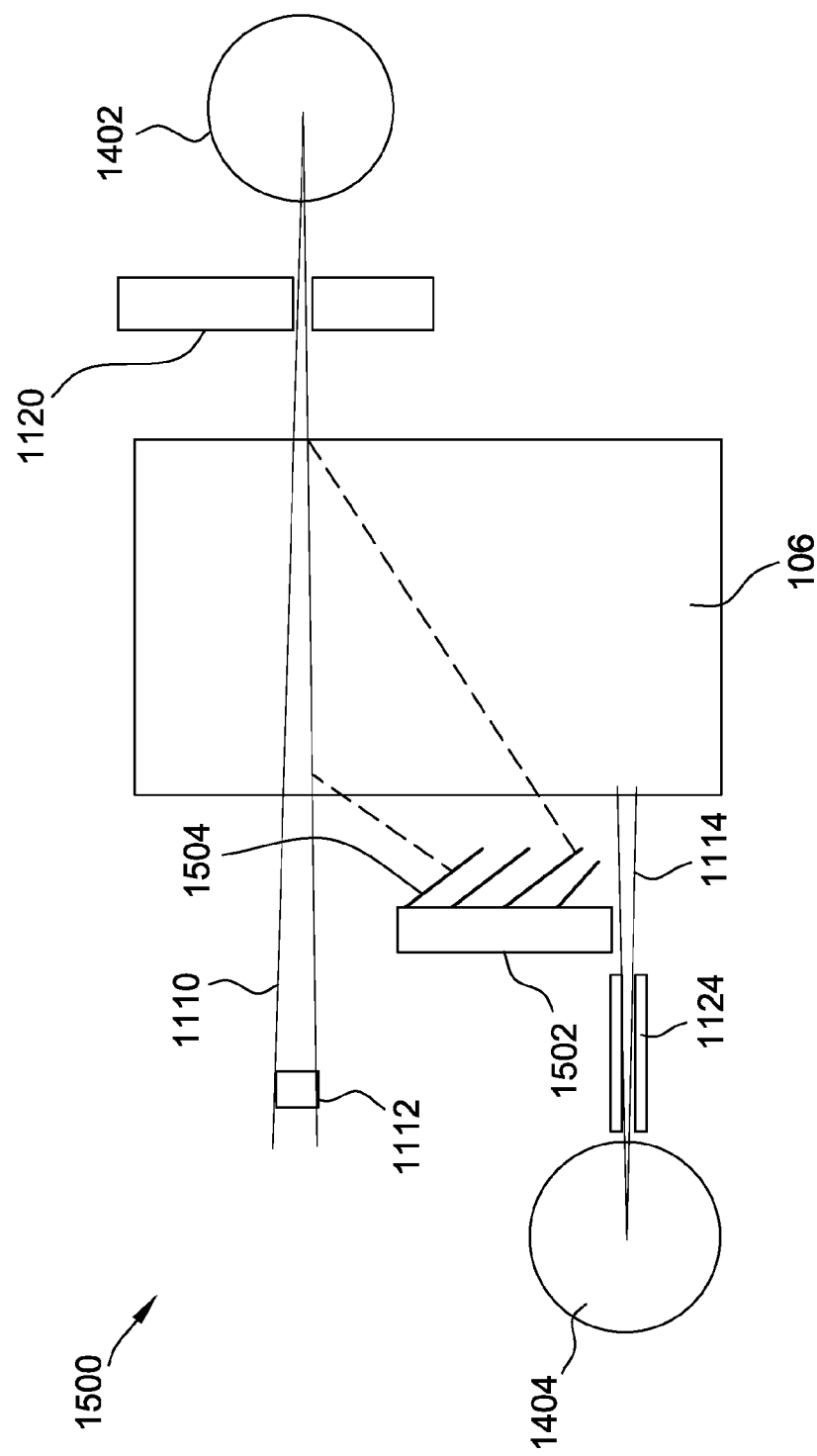
FIG. 15 is a top schematic view of an example embodiment of another combined imaging system.

FIG. 15 is a top schematic view of an example embodiment of another combined imaging system 1500. Combined imaging system 1500 is generally similar to combined imaging system 1400 (shown in FIG. 14). However, in this embodiment, a backscatter detector 1502 is only positioned on one side of backscatter beam 114, and collimators 1504 are coupled to backscatter detector 1502. Further, first x-ray source 1402 is located on an opposite side of object 106 from second x-ray source 1404. Collimators 1504 are positioned and oriented to block deflected beams from transmission beam 1110 from reaching backscatter detector 1502. Also the distance between transmission beam 1110 and backscatter detector 1502, as well as beam attenuation, reduce the crosstalk. Accordingly, in combined imaging system 1500, first and second x-ray sources 1402 and 1404 may be operated simultaneously. Further, first x-ray source 1402 may have a higher energy than second x-ray source 1404, and signal processing and/or detector weighting techniques (similar to those described above) may also be used. The signal detected by backscatter detector 1502 may be lower because backscatter detector 1502 is only positioned on one side of backscatter beam 1114. However, the disadvantages of a lower signal are at least partially offset by the benefits of operating first and second x-ray sources 1402 and 1404 simultaneously.

In the embodiments described herein, various features may be implemented to avoid missing imaging portions of the object as the object moves through the imaging system. For example, a data acquisition frequency may be increased. Further, relatively wide detectors and/or multi-column x-ray detectors (with high resolution) may be used to enable faster scanning speeds while still imaging the complete object.

Exemplary embodiments of methods and systems for inspection portals for imaging an object are provided herein. An inspection portal includes a first x-ray source configured to emit a first beam towards the object, a first backscatter detector configured to detect backscatter from the first beam, a second x-ray source configured to emit a second beam towards the object, and a second backscatter detector configured to detect backscatter from the second beam. The system further includes at least one first collimator coupled to the first backscatter detector and at least one second collimator coupled to the second backscatter detector, the at least one first collimator oriented to detect backscatter from the first beam and to block scatter from the second beam, and the at least one second collimator oriented to detect backscatter from the second beam and to block scatter from the first beam. The first and second backscatter detectors each include a plurality of detector elements, wherein the first and second backscatter detectors are configured to weight signals acquired using each detector element based on a current position of the first and second beams. Further the first backscatter detector is configured to use signal processing techniques to mitigate crosstalk due to scatter from the second beam, and the second backscatter detector is configured to use the signal processing techniques to mitigate crosstalk due to scatter from the first beam.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An inspection portal for imaging an object, said inspection portal comprising:
    a first x-ray source configured to emit a first beam towards the object;
    a first backscatter detector configured to detect backscatter from the first beam;
    a second x-ray source configured to emit a second beam towards the object;
    a second backscatter detector configured to detect backscatter from the second beam; and
    at least one first collimator coupled to said first backscatter detector and at least one second collimator coupled to said second backscatter detector, said at least one first collimator oriented to detect backscatter from the first beam and to block scatter from the second beam, and said at least one second collimator oriented to detect backscatter from the second beam and to block scatter from the first beam, wherein said first backscatter detector is further configured to use signal processing techniques to mitigate crosstalk due to scatter radiation from the second beam, and wherein said second backscatter detector is further configured to use the signal processing techniques to mitigate crosstalk due to scatter radiation from the first beam.

2. The inspection portal of claim 1, wherein said first x-ray source and said second x-ray source are offset along a direction of travel of the object through said inspection portal.

3. The inspection portal of claim 1, wherein said first and second x-ray sources are located on opposite sides of the object.

4. The inspection portal of claim 1, further comprising a transmission system.

5. The inspection portal of claim 1, further comprising:
    at least a third x-ray source configured to emit a third beam towards the object; and
    a third backscatter detector configured to detect backscatter from the third beam, wherein said first and second x-ray sources are configured to be active when said third x-ray source is inactive, and wherein said third x-ray source is configured to be active when said first and second x-ray sources are inactive.

6. The inspection portal of claim 1, wherein said first and second backscatter detectors each comprise a plurality of detector elements, and wherein said first and second backscatter detectors are configured to weight signals acquired using each said detector element based on a current position of the first and second beams.

7. An inspection portal for imaging an object, said inspection portal comprising:
    a first x-ray source configured to emit a first beam;
    a collimator defining an aperture configured to generate a transmission beam from the first beam;
    a transmission detector configured to detect transmission from the transmission beam;
    a second x-ray source configured to emit a second beam;
    a chopper wheel configured to generate a backscatter beam from the second beam, wherein said inspection portal is configured such that the transmission beam and the backscatter beam are incident on the object simultaneously;
    a backscatter detector configured to detect backscatter from the backscatter beam; and
    at least one collimator coupled to said backscatter detector, said at least one collimator positioned and oriented to prevent backscatter from the transmission beam from reaching said backscatter detector.

8. The inspection portal of claim 7, wherein said backscatter detector is positioned on a single side of the backscatter beam.

9. An inspection portal for imaging an object, said inspection portal comprising:
- a first x-ray source configured to emit a first beam towards the object;
- a first backscatter detector configured to detect backscatter from the first beam;
- a second x-ray source configured to emit a second beam towards the object;
- a second backscatter detector configured to detect backscatter from the second beam; and
- at least one first collimator coupled to said first backscatter detector and at least one second collimator coupled to said second backscatter detector, said at least one first collimator oriented to detect backscatter from the first beam and to block scatter from the second beam, and said at least one second collimator oriented to detect backscatter from the second beam and to block scatter from the first beam, wherein said first and second backscatter detectors each comprise a plurality of detector elements, wherein said first and second backscatter detectors are configured to weight signals acquired using each said detector element based on a current position of the first and second beams, wherein said first backscatter detector is configured to use signal processing techniques to mitigate crosstalk due to scatter from the second beam, and wherein said second backscatter detector is configured to use the signal processing techniques to mitigate crosstalk due to scatter from the first beam.

10. The inspection portal of claim 9, wherein said first and second backscatter detectors comprises plastic scintillators loaded with bismuth or tin.

11. The inspection portal of claim 9, further comprising a transmission system positioned proximate said first and second backscatter detectors, said transmission system configured to emit a beam to detect radiation transmitted through the object.

12. The inspection portal of claim 11, wherein said transmission system is configured to selectively control emission of the transmission beam using a shutter or a gated x-ray source to ensure said first and second backscatter detectors collect backscatter signals without crosstalk from said transmission system.

* * * * *